US011649846B2

(12) United States Patent
Bradshaw et al.

(10) Patent No.: US 11,649,846 B2
(45) Date of Patent: *May 16, 2023

(54) SEGMENTED NUTS

(71) Applicant: SEGNUT PTY LTD, Mandurah (AU)

(72) Inventors: Brian Eric Bradshaw, Halls Head (AU); Tom Peter Baskovich, Trigg (AU); Sam William Turnbull, Spearwood (AU)

(73) Assignee: Segnut Pty Ltd, Mandurah (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/366,691

(22) Filed: Mar. 27, 2019

(65) Prior Publication Data

US 2019/0234445 A1    Aug. 1, 2019

Related U.S. Application Data

(63) Continuation of application No. PCT/AU2017/051057, filed on Sep. 27, 2017.

(30) Foreign Application Priority Data

Sep. 27, 2016  (AU) ................................ 2016903923

(51) Int. Cl.
    *F16B 37/08*  (2006.01)
(52) U.S. Cl.
    CPC ...... *F16B 37/0864* (2013.01); *F16B 37/0807* (2013.01)
(58) Field of Classification Search
    CPC .............. F16B 37/0864; F16B 37/0857; F16B 37/0892

(Continued)

(56) References Cited

U.S. PATENT DOCUMENTS

| 386,381 A | * | 7/1888 | Clay | F16B 39/36 |
| | | | | 411/266 |
| 820,941 A | * | 5/1906 | Pitsch | F16B 39/02 |
| | | | | 411/273 |

(Continued)

FOREIGN PATENT DOCUMENTS

| CN | 101844342 A | 9/2010 |
| CN | 201723552 U | 1/2011 |

(Continued)

*Primary Examiner* — Flemming Saether

(74) *Attorney, Agent, or Firm* — Levine Bagade Han LLP

(57) ABSTRACT

A segmented nut has inner segments and an outer sleeve. Part of the sleeve interface portion and part of the segment interface portion engage when the sleeve rotates relative to the inner nut during release of the segmented nut with part of the segment interface portion at a greater distance from a central axis of the segmented nut than a minimum distance of the at least part of the sleeve interface portion from the central axis. One or more of the segments can include a retainer preventing the sleeve moving toward a free face of the segment(s). One or more of the segments can have a flange portion providing an increased working (compression) face relative to a plain segmented nut. An assembled segmented nut can include some radial freeplay for the segments to move radially whilst being retained within the sleeve prior to application of the segmented nut to a threaded bolt, stud or rod such that threading of the segmented nut onto the thread of the bolt, stud or rod removes the freeplay.

30 Claims, 8 Drawing Sheets

(58) Field of Classification Search
USPC .......................... 411/211–267, 277–278, 433
See application file for complete search history.

(56) References Cited

U.S. PATENT DOCUMENTS

| | | | | |
|---|---|---|---|---|
| 1,211,387 | A * | 1/1917 | Beck | F16L 37/1215 |
| | | | | 285/34 |
| 1,241,432 | A * | 9/1917 | Peltz | F16B 37/0864 |
| | | | | 411/433 |
| 2,267,252 | A * | 12/1941 | Pitsch | F16L 37/252 |
| | | | | 285/34 |
| 2,463,179 | A * | 3/1949 | Iftiger, Sr. | F16L 37/1215 |
| | | | | 285/34 |
| 2,748,647 | A * | 6/1956 | Notturno | F16B 37/0892 |
| | | | | 411/433 |
| 4,632,437 | A * | 12/1986 | Robson | F16L 37/101 |
| | | | | 285/243 |
| 4,737,059 | A * | 4/1988 | Batten | F16B 37/0864 |
| | | | | 411/433 |
| 4,930,961 | A * | 6/1990 | Weis | F16B 37/0864 |
| | | | | 411/266 |
| 5,049,017 | A | 9/1991 | Reynolds | |
| 5,700,121 | A | 12/1997 | Minola | |
| 5,755,544 | A * | 5/1998 | Muller | F16B 37/0864 |
| | | | | 285/34 |
| 5,906,464 | A | 5/1999 | Wedenig | |
| 6,053,655 | A | 4/2000 | Mazhar | |
| 7,658,582 | B2 * | 2/2010 | Doubler | F16B 37/0864 |
| | | | | 411/433 |
| 9,637,893 | B2 * | 5/2017 | Lin | F16B 37/0864 |
| 10,533,598 | B2 * | 1/2020 | Bradshaw | F16B 37/0892 |
| 2005/0254919 | A1 * | 11/2005 | Takahashi | B24B 45/006 |
| | | | | 411/369 |
| 2010/0166525 | A1 | 7/2010 | Dvorak | |
| 2010/0294086 | A1 | 11/2010 | Gay et al. | |
| 2020/0307835 | A1 * | 10/2020 | Arulf | F16B 37/0864 |

FOREIGN PATENT DOCUMENTS

| | | |
|---|---|---|
| KR | 10-2015-0016892 A | 2/2015 |
| WO | WO 1997/029303 | 8/1997 |
| WO | WO 2009/141545 | 11/2009 |
| WO | WO 2016/094953 | 6/2016 |
| WO | WO 2018/058185 | 4/2018 |

\* cited by examiner

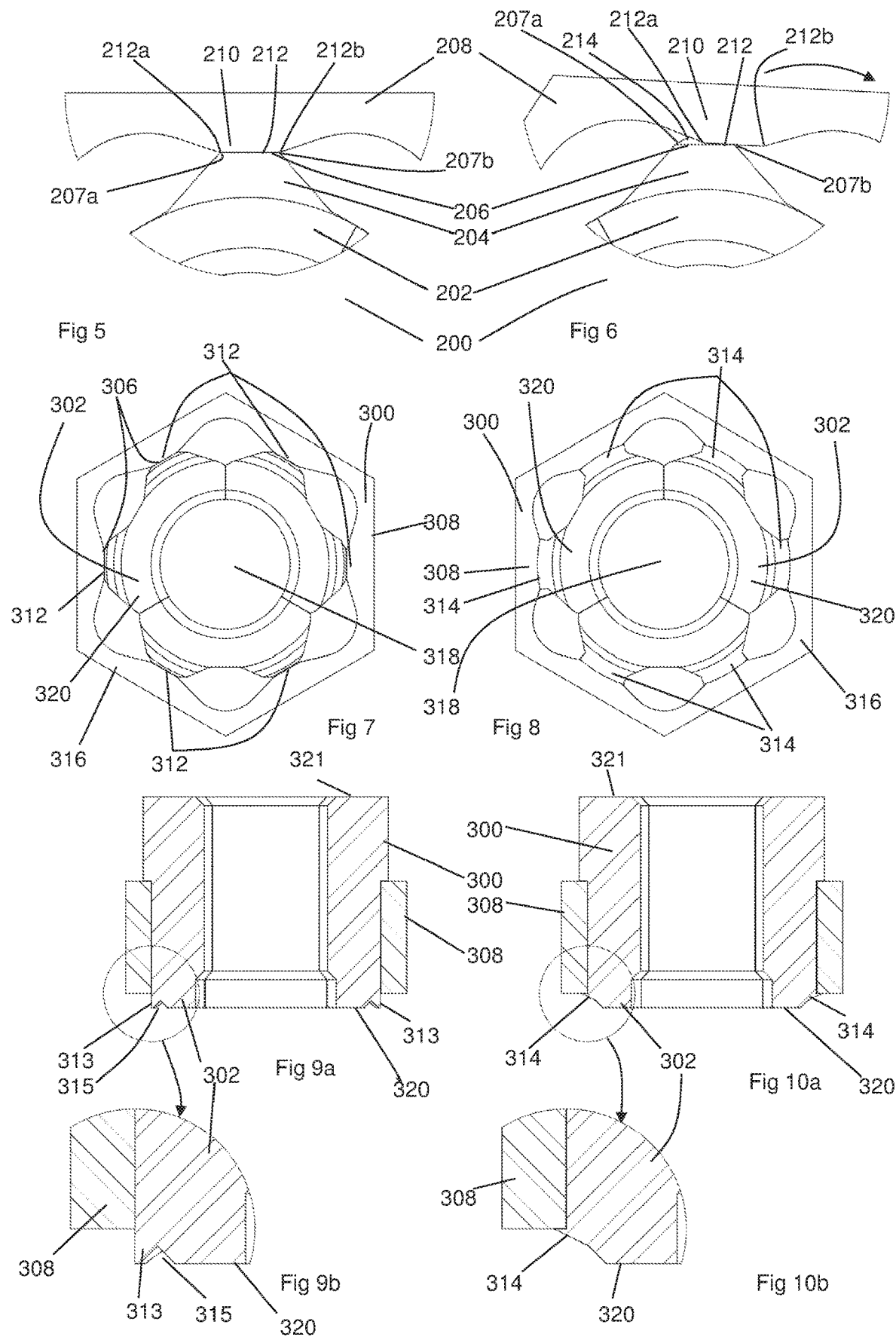

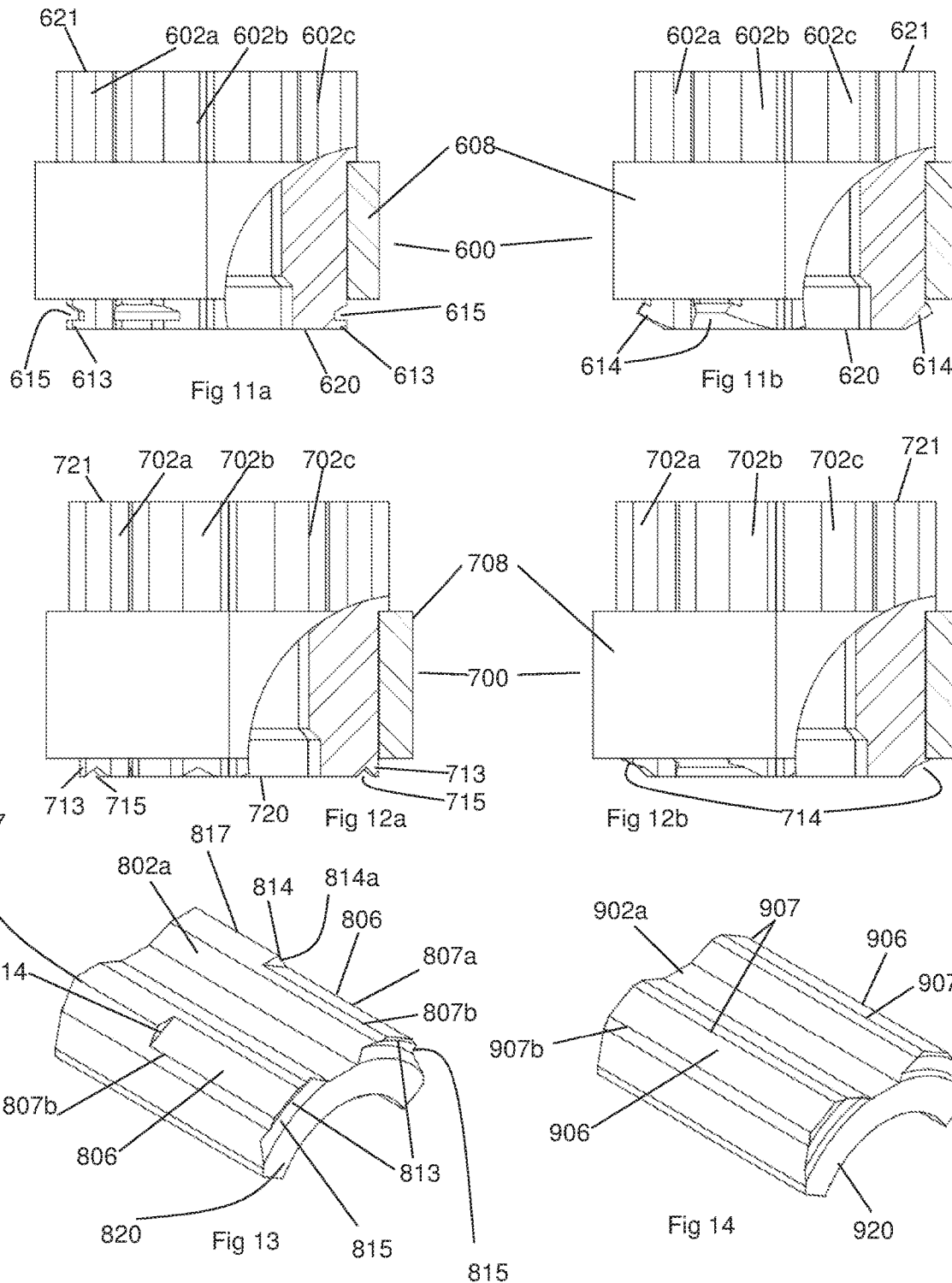

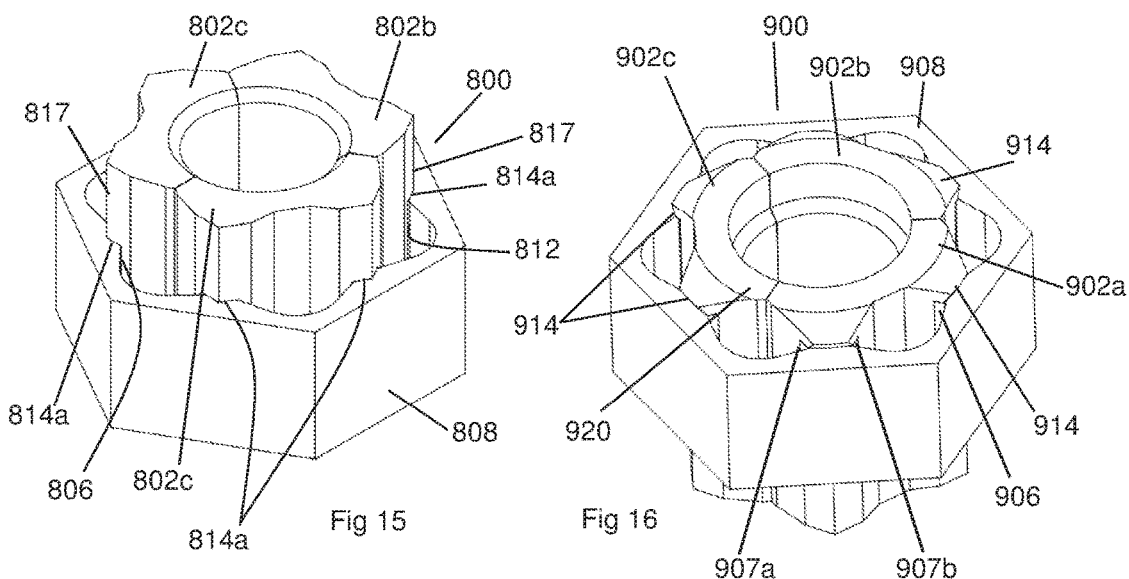
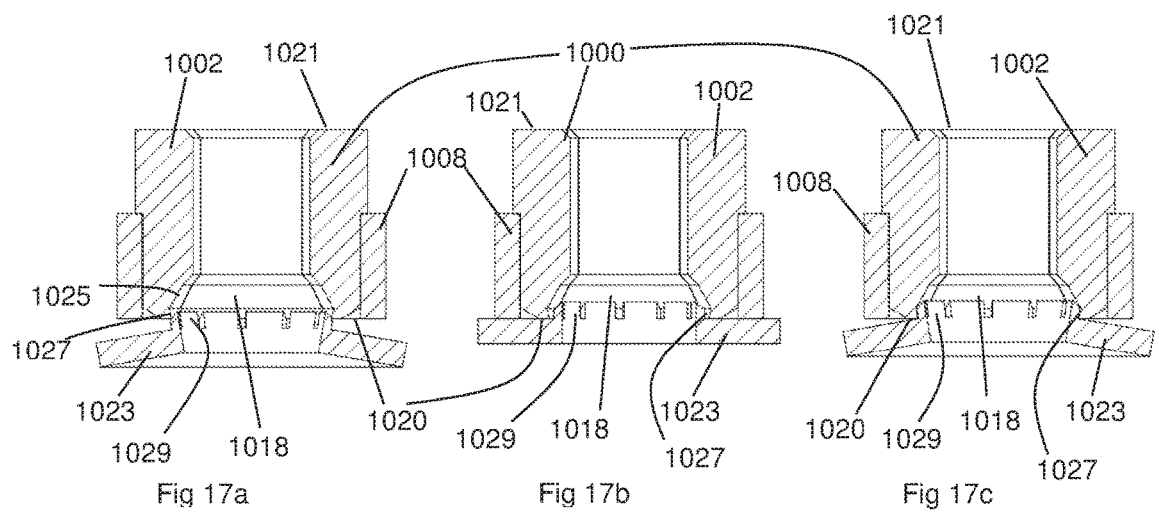
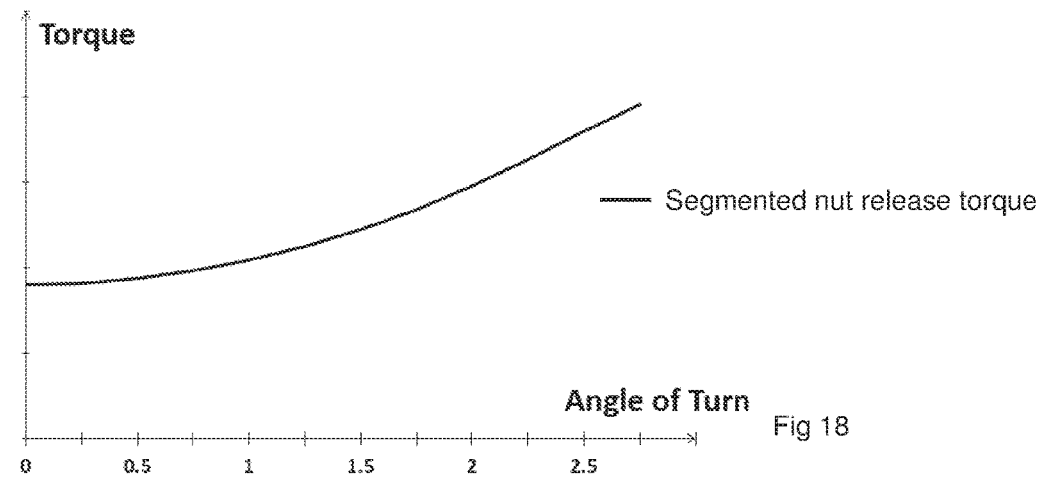

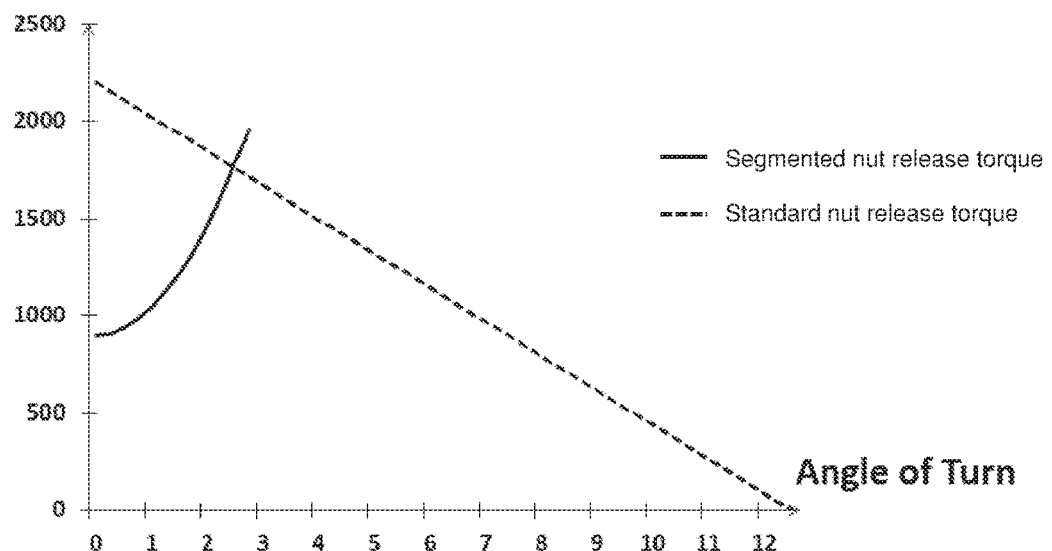
Fig 19
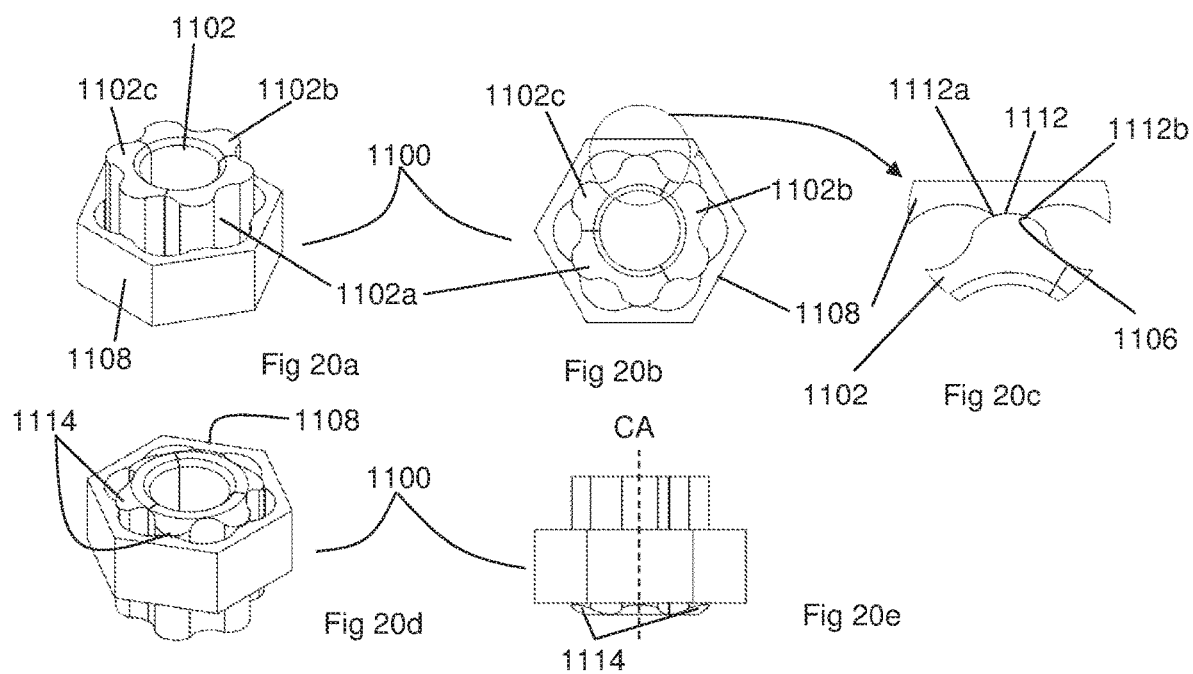

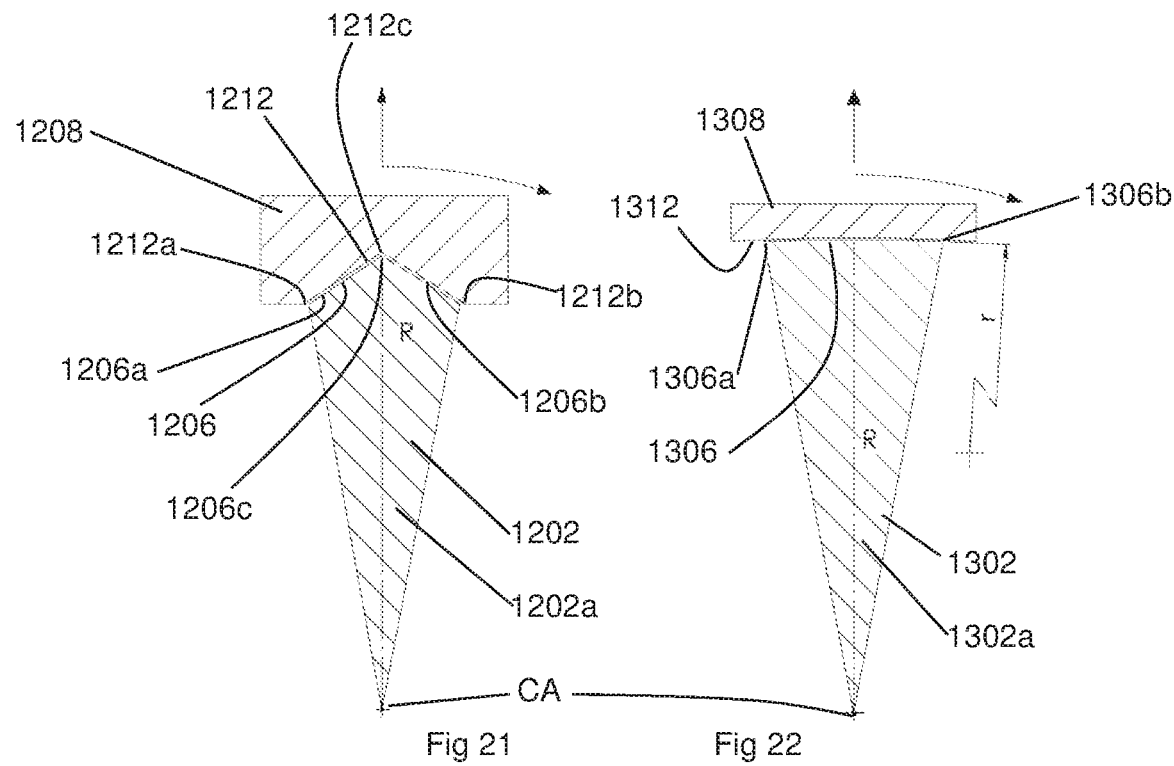
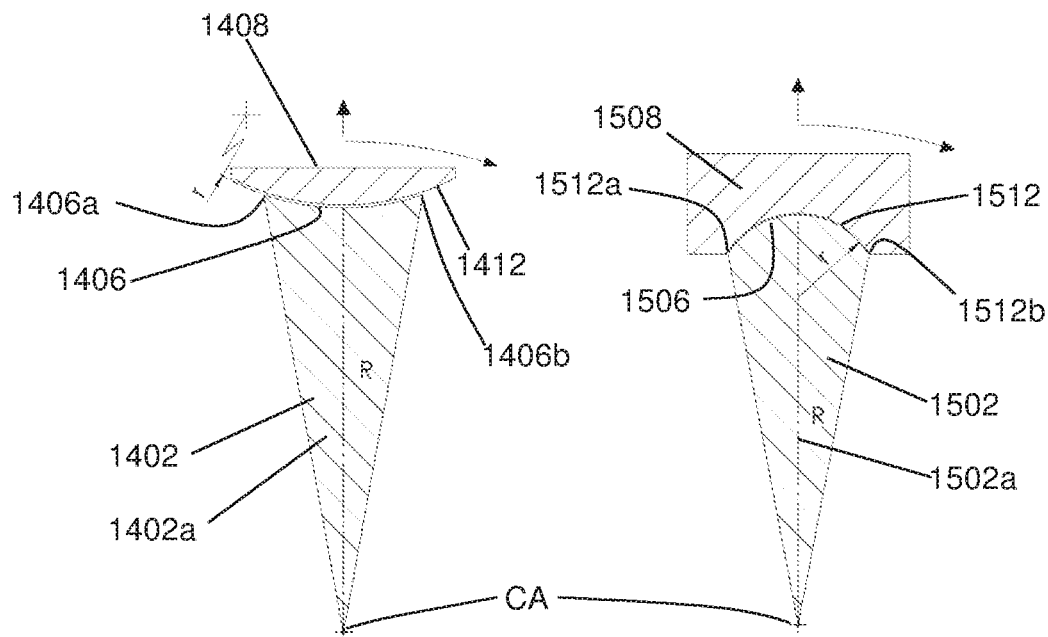

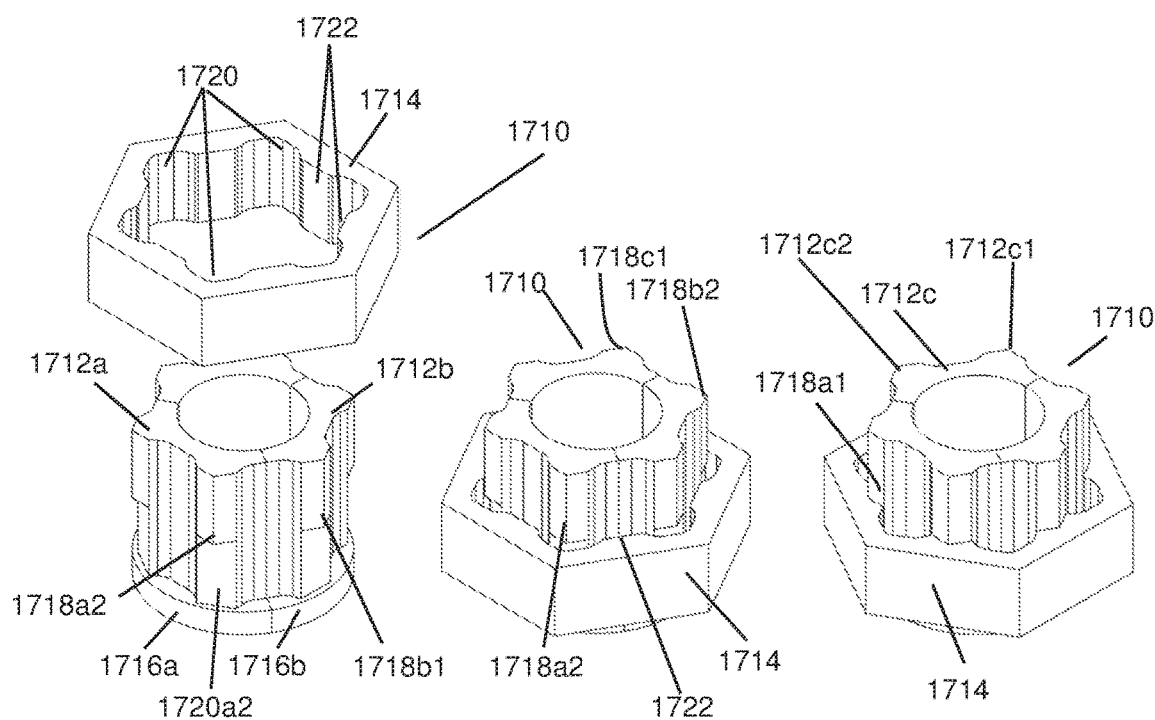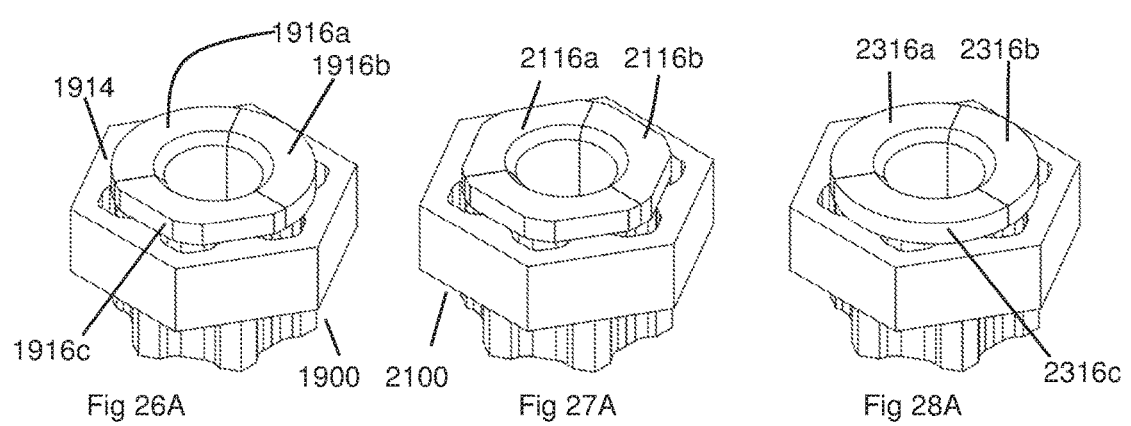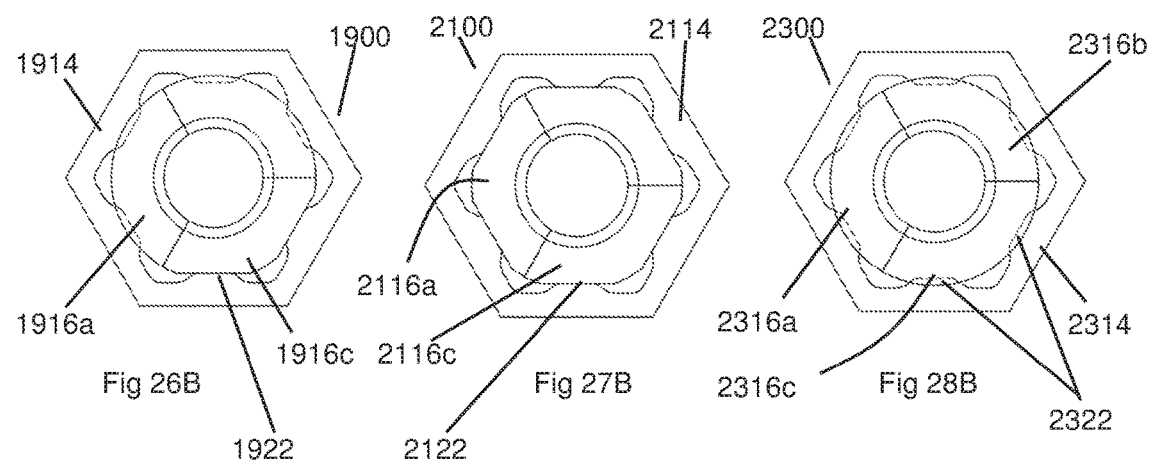

SEGMENTED NUTS

CROSS-REFERENCE TO RELATED APPLICATIONS

This application is a continuation of International Application No. PCT/AU2017/051057, filed Sep. 27, 2017, which claims priority to Australian Application No. 2016903923, filed Sep. 27, 2016, both of which are incorporated by reference herein in their entireties.

FIELD OF THE INVENTION

The present invention relates to segmented nuts applicable to threaded bolts, machined thread screws, threaded studs or threaded rods.

BACKGROUND TO THE INVENTION

A segmented nut known to the Applicant is described in International Patent Application PCT/AU2015/050803, the contents of which are incorporated herein in their entirety, which application includes an inner nut formed of multiple segments, each segment having a portion of thread to form a thread to engage the thread of a bolt, machined screw, stud or rod.

An outer sleeve of the aforementioned segmented nut has an internal facing bearing surface which engages and retains together the segments of the inner nut about the thread of a bolt, stud or rod by providing radial restraint of the segments.

Rotation of the sleeve relative to the segments disengages the sleeve from retaining the segments together. The sleeve can be removed from around the segments. The segments can separate and release from engagement with the thread of the bolt, machined screw, stud or rod, and the nut is fully released.

The segmented nut described in International Patent Application PCT/AU2015/050803 has a radial bearing surface on each of the external surfaces of the segments, at a common radius from the central axis through the segmented nut, that engage with the inner surface of the sleeve. Such a 'radial' bearing surface is part of a cylindrical interface between the segments and the sleeve along the circumference of the cylindrical interface. Each segment and the sleeve can therefore "slide" relative to each other with no change in the dilation of the sleeve.

Such radiused surfaces provide sufficient engagement for radial constraint by the sleeve. The radiused contact area requires accurate tolerancing during assembly of the segmented nut to ensure the nut does not accidentally disassemble (rotationally or axially) during transport or storage.

To help ensure that the assembled nut does not separate during transport, storage and initial use, the segmented nut described in International Patent Application PCT/AU2015/050803 has an interference fit between the inner segments and outer sleeve.

However, the release torque of the sleeve relative to the inner segments is sensitive to the degree of the interference fit, and is dependent on accurate tolerancing, adding a degree of difficulty for mass production.

The interference fit could also cause 'galling' (or cold-welding) issues during press-fitting of the sleeve about the segments.

Such 'galling' is caused by high adhesion between the inner surface of the sleeve and the outer (radiused) bearing surface of each of the segments.

When the material 'galls', some of that material is pulled with the contacting surface, especially if there is a large amount of force compressing the surfaces together.

Such galling affects the final release torque of the sleeve relative to the inner nut, and increases the variability/unpredictability of the release torque between one segmented nut and another.

It has also been realised that the aforementioned segmented nut can be augmented by providing improved engagement characteristics between the segments and sleeve to help ensure safe transport and storage of the segmented nut in an assembled condition with more consistent release torque characteristics.

SUMMARY OF THE INVENTION

With the aforementioned in mind, an aspect of the present invention provides a segmented nut for threaded engagement with a threaded shaft of a bolt, stud or rod, the segmented nut including an inner nut including at least two segments providing at least a portion of a threaded aperture through the inner nut for engagement with the threaded shaft of the bolt, stud or rod, and a sleeve engaging around and retaining together the at least two segments when the segmented nut is assembled, the sleeve including a sleeve interface portion, and at least one of the segments having a segment interface portion, at least part of the sleeve interface portion and at least part of the segment interface portion being in engagement when the sleeve rotates relative to the inner nut during release of the segmented nut, the at least a part of the segment interface portion being at a greater distance from a central axis of the segmented nut than a minimum distance of the at least part of the sleeve interface portion from the central axis.

In use, the sleeve and the segments can only be rotated relative to each other toward a segmented nut release position by the segment interface portion of the segment passing the sleeve interface portion of the sleeve.

Preferably, there is radial distance overlap of the at least part of the segment interface portion and the at least part of the sleeve interface portion from the central axis (CA) through the segmented nut.

The central axis, CA, passes centrally through the aperture through segmented nut from one face side of the segmented nut to the other face side of the segmented nut.

A further aspect of the present invention provides a segmented nut for threaded engagement with a threaded shaft of a bolt, stud or rod, the segmented nut including an inner nut including at least two segments providing at least a portion of a threaded aperture through the inner nut for engagement with the threaded shaft of the bolt, stud or rod, and a sleeve engaging around and retaining together the at least two segments when the segmented nut is assembled, the sleeve having an inner surface including a sleeve interface portion, and at least one of the segments having at least one respective segment interface portion, at least one of the sleeve interface portion and segment interface portion undergoing resilient deformation through contact of the sleeve interface portion and segment interface portion during relative rotation of the sleeve and inner nut as the sleeve interface portion and segment interface portion pass one another during release of the segmented nut.

Preferably the segment interface portion and/or the sleeve interface portion may be provided between spaced apexes on the respective segment or sleeve.

The sleeve interface portion and/or the segment interface portion may be curved, flat or planar, or combinations of two or more thereof. The sleeve interface portion and/or the segment interface portion may have at least one apex or ridge, which may be radiused providing a curved apex or ridge, or may have a sharp discontinuity of surface providing an angular apex or ridge (such as an acute internal angle of less than 90°, preferably less than 45° and more preferably less than 30°.

A further aspect of the present invention provides a segmented nut including an inner nut having at least two segments providing at least a portion of a threaded aperture through the inner nut for engagement with the threaded shaft of the bolt, stud or rod, and a sleeve engaging around and retaining together the at least two segments when the segmented nut is assembled, and the segmented nut including at least one retainer preventing axial removal of the sleeve from the segments while the segmented nut is assembled and allowing the sleeve to be removed axially from the segments when the sleeve is rotated relative to the segments to release the segmented nut.

Another aspect of the present invention provides a segment of an inner nut for a segmented nut, the segment of the inner nut including at least one axial retainer, which, in use, prevents axial removal of a sleeve of the segmented nut from the segment while the segmented nut is assembled and allows the sleeve to be removed axially from the segment when the sleeve is rotated relative to the segment to release the segmented nut.

A yet further aspect of the present invention provides a segment of an inner nut for a segmented nut, the segment of the inner nut including an interface portion wherein, when the segment is in an assembled segmented nut, at least a portion of the segment interface portion is at a greater distance from a central axis of the segmented nut than a minimum distance of a sleeve interface portion of the sleeve, and, in use, the sleeve and the segment can only be rotated relative to each other toward a segmented nut release position by the interface portion of the segment passing the sleeve interface portion of the sleeve.

A further aspect of the present invention provides a segmented nut including an inner nut having at least two segments providing at least a portion of a threaded aperture through the inner nut, and a sleeve around the at least two segments, wherein, the sleeve provides clearance spaces for the at least two segments to move radially relative to a central axis through the segmented nut when the sleeve is rotationally orientated in a release position relative to the at least two segments, and wherein the at least two segments and the sleeve are retained together by contact of the sleeve and the at least two segments when the sleeve is rotationally orientated engaged with the at least two segments.

For the avoidance of doubt, the central axis through the segmented nut passes through the radial centre of the segmented nut between the opposed open ends thereof i.e. between the free and working (compression) faces.

A yet further aspect of the present invention provides a segmented nut having at least two segments and a sleeve, wherein, when the at least two segments and the sleeve are assembled and retained together, the at least two segments have an amount of radial freedom of movement (or freeplay) within the sleeve and relative to a central axis through the segmented nut.

For example, the segmented nut may provide a radial clearance fit between the at least two segments and the sleeve when the segmented nut is assembled and in an unreleased orientation e.g. the state of the segmented nut when the segmented nut is ready to be applied to the thread of a bolt, threaded stud or threaded rod.

It will be appreciated that the at least two segments and the sleeve can be retained together in an assembled orientation ready for the segmented nut to be to be applied to a thread of a bolt, stud or rod, with the at least two segments held within and by the sleeve but having some radial freedom such that radial force or tension within the segmented nut is created when the segmented nut is applied to the thread of the bolt, stud or rod and any of the described radial 'freeplay' or 'slackness' of the at least two segments is removed.

In other references below, the radius is actually the "profile" or fillet radius of the feature being described, the centre of which may not (and in fact is not) the centre of the nut.

Preferably, during rotational movement of the sleeve relative to the at least two segments when releasing the segmented nut, radial force(s) between the sleeve and the at least two segments initially increase(s) by contact of the segment interface portion of the segment(s) with the respective sleeve interface portion of the sleeve and subsequently decreases enabling release the sleeve from retaining engagement with the inner nut.

Preferably, one or both of the sleeve interface portion of the sleeve and the respective segment interface portion of the segment of the inner nut is/are flat. These features provide a stable/self-centring position for the sleeve and inner nut to engage when assembled together prior to tightening about the bolt, stud or rod thread.

Preferably, the segmented nut includes at least three segments.

One or more of the segments may have at least two interface portions.

When the segmented nut is in a released state/orientation with the sleeve still around the segments, the segments are permitted to release radially into clearance spaces provided by the sleeve.

Preferably the clearance spaces are sufficient to allow the threaded portions of the segments to clear radially from the respective thread(s) of the bolt, stud or rod.

A flat bearing portion of the inner surface of the sleeve and the faced surface of the inner nut being in a face-to-face orientation, and the biasing by the apexes of the segment interface portion restricting the sleeve and nut from rotating relative to one another ensures that the sleeve and inner nut remain rotationally static relative to one another, such that they will tend to stay in position as well as reverting back following any inadvertent small rotational deflections.

A segment interface portion of the segment facing an opposed sleeve interface portion of the inner surface of the sleeve allows for nominal clearance fits for assembly of the segmented nut, reducing occurrences of galling during assembly and the tolerances between the sleeve and the segments need not be as tight as a previously adopted interference fit, whilst still preventing the outer sleeve and inner segments freely rotating with respect to each other.

Some nominal clearance between the segment interface portion of the segment and a sleeve interface portion of the inner surface of the sleeve is accommodated in one or more embodiments of the present invention wherein, when there is relative rotation of sleeve to segments, part of the respective segment bears against the inner face of the sleeve.

It will be appreciated that galling can remain hidden at the interference interface between the sleeve and the inner nut on assembly of previously developed tight tolerance segmented nuts. The hidden galling causes the segmented nuts to vary in release toque characteristics between one nut and the next, creating unpredictable performance of the segmented nuts. Whilst this in itself does not necessarily render other arrangements unacceptable (as there will normally be a higher release torque required than nominal), it is understood that a more repeatable and predicable release torque is more desirable. Embodiments of the present invention described herein help to alleviate or remove this problem.

Axial retention of the sleeve and inner nut together prevents accidental/inadvertent disassembly of the segmented nut during transport, storage and initial use.

Incorporating into the segmented nut axial retention of the sleeve to prevent significant axial movement of the sleeve away from the working face of the nut provides a significant advantage. Axial retention of the sleeve to prevent the sleeve coming off the free face of the segmented nut provides confidence that the sleeve will not slide/walk (e.g. by vibration of the nut) axially off the segments.

Preferably, one or more retainers providing axial retention of the sleeve, preventing the sleeve from coming off the free end of the segmented nut, may be integral to the segmented nut.

The face to face initial assembled orientation of the sleeve interface portion of the inner surface of the sleeve and the segment interface portion of the inner nut segment, and the requirement for increased rotational force to cause deflection of one or both of the sleeve interface portion and segment interface portion ensures that the segmented nut has a self centring characteristic, and preferably reduces unpredictable/inconsistent release torque characteristics.

A segmented nut of one or more embodiments of the present invention may include a captive washer. For example, a Belleville type spring washer may be retained to the segmented nut, preferably to the inner nut.

A preassembled washer can extend radially to provide a retainer preventing the sleeve from moving axially and releasing from the inner nut.

The flat-on-flat bearing portion and segment interface portion forces radial deformation of one or both the segment and sleeve at their interface as a function of angle of twist. This is because, the contact radius changes as the segment and sleeve rotate relative to one another, with the minimum radius being measured where the flat segment interface portion of the inner nut and the flat sleeve interface portion of the sleeve are aligned.

During relative rotation of the sleeve and segment, the increase in radius from the segment interface portion to the apex forces an outward deflection/deformation of the sleeve. The total deflection/deformation depends on the angle of twist and the length of the flat segment interface portion. The radial deformation of the sleeve generates bending and hoop stresses, which are resisted by the sleeve according to its stiffness in the respective modes.

At least one axial retainer, such as a retention step, provided on the inner nut provides a positive shoulder or lip which the sleeve cannot pass over without undergoing substantial, potentially destructive, deformation. Deformation in this direction is prevented by the stiffness of the sleeve.

Preferably the axial retainer is integral with the respective segment.

Preferably, the axial retainer is formed during an assembly process for the segmented nut, whereby the sleeve is put around the assembled segments of the inner nut and the axial retainer or each of multiple axial retainers is/are formed. Forming the axial retainer(s) may be by forging or pressing one or more tabs to extend from the segment(s) to cover at least part of a face of the sleeve.

The axial retainer(s) may be provided adjacent the working (compression) face of the inner nut, or adjacent to a free face of the outer sleeve distal from the working (compression) face of the inner nut.

The axial retainer(s) adjacent the free face of the sleeve may be provided by one or more steps in at least one, preferably each, segment. The one or more steps may overlap a free face of the sleeve when the segmented nut is assemble, thereby preventing axial movement of the sleeve completely from the inner nut.

The at least one axial retainer provides a respective at least one tool engagement portion for a tool to rotationally drive the inner nut. The at least one tool engagement portion may include at least one tool engagement face for contact with at least one respective driver face of the tool for use in applying a torque to the inner nut, such as when applying/tightening the nut on a threaded bolt, rod or stud.

A lower axial retainer arrangement may be provided as one or more formed lips. When assembled, a portion of the working face of the inner nut undergoes a lip forming process, which the sleeve cannot pass over axially toward the working face of the inner nut. This advantageously allows the segments to be inserted easily into the sleeve with the integral, free face retention feature capturing the sleeve at the free face end, and then the final forming process capturing the sleeve at the working face end to completely capture the sleeve axially.

In one design, a groove is formed, such as by cutting, grinding or milling, in the working face of the inner nut to define the inner bound of the material to be deformed. Alternatively, an undercut is provided to relieve the area under the lip, ensuring that no dilation occurs under the lip that may otherwise interfere with the interface between the sleeve and the inner segments.

A captive washer arrangement may include a Belleville washer with a segmented (such as castellated) step. When the washer is in its pre-compressed state, this step forms a concave zone with an acute angle, which becomes perpendicular when flattened out. The lip is chamfered radially, so that when compressed axially, the steps will "click in" to a retaining groove on each segment. When not compressed, the washer will engage radially, slightly preloading the segments against the outer sleeve, and also locking in the groove so that it cannot be pulled out. However, once compression of the washer begins, the washer no longer forces out radially on the segments and thus becomes free-spinning, a requirement to perform correctly as a washer.

Sleeve stability/angle of twist sensitive release torque can also be achieved through non-flat-to-flat contact between the sleeve interface portion of the sleeve inner surface and the segment interface portion of the respective segment, as long as the radius at the contact is less than the radius that the parts move along.

Axial retention could be achieved through some staking process, using a deformation process on the assembled nut at the top to prevent movement.

Sleeve stability about the segments when the segmented nut is assembled is achieved, plus the added benefit of axial retention.

In addition to this, reduced radial retaining force (radial interference fit force) between the sleeve and segments, and therefore reduced tolerances between the sleeve and segments, reduce or avoid the need for high tolerance machining of the sleeve/segments to fit the segments/sleeve, substantially reducing manufacturing costs.

The option for a captive washer design ensures the segmented nut can be assembled with a washer, preventing self-loosening and substantially improving safety in certain installed applications.

One or more forms of the segmented nut may include at least one retainer preventing axial removal of the sleeve from the segments while the segmented nut is assembled and allowing the sleeve to be removed axially from the segments when the sleeve is rotated relative to the segments to release the segmented nut.

At least one of the segments of an inner nut may include at least one axial retainer, which, in use, prevents axial removal of a sleeve of the segmented nut from the segment while the segmented nut is assembled and allows the sleeve to be removed axially from the segment when the sleeve is rotated relative to the segment to release the segmented nut.

At least one of the segments, preferably two or more, and more preferably all of the segments, may include a flange portion at a working face of the respective segment.

Preferably the respective flange portion overlaps at least a portion of the sleeve.

A further aspect of the present invention provides a segmented nut including an inner nut having at least two segments providing at least a portion of a threaded aperture through the inner nut for engagement with the threaded shaft of the bolt, stud or rod, and a sleeve engaging around and retaining together the at least two segments when the segmented nut is assembled, and at least one the segments including a flange portion at a working face of the respective segment.

The respective flange portion may overlap at least a portion of the sleeve.

Another aspect of the present invention provides a segment of an inner nut for a segmented nut, the segment of the inner nut including a flange portion at a working face of the respective segment.

The respective flange portion may overlap at least a portion of sleeve of the segmented nut when the segmented nut is assembled.

BRIEF DESCRIPTION OF THE DRAWINGS

One or more embodiments of the present invention will be described with reference to at least some of the accompanying Figures, in which:

FIGS. 5 and 6 show detail of a section of a segmented nut according to a further embodiment of the present invention.

FIGS. 7 and 8 show an underside view of a segmented nut according to an embodiment of the present invention. FIG. 7 shows pre-formation of axial retainers, with detail shown in FIGS. 9a and 9b referenced below. FIG. 8 shows formed axial retainers with detail shown in FIGS. 10a and 10b referenced below.

FIGS. 9a and 9b show a cross sectional view through a segmented nut according to an embodiment of the present invention at a stage in the formation of axial retainers.

FIGS. 10a and 10b show a cross sectional view through a segmented nut according to an embodiment of the present invention with the retainers formed.

FIGS. 11a and 11b show alternative arrangements of proto and formed retainers respectively, according to another embodiment of the present invention.

FIGS. 12a and 12b show alternative arrangements of proto and formed retainers respectively, according to another embodiment of the present invention.

FIG. 13 shows a segment of an inner nut of a segmented nut according to an embodiment of the present invention. The segment includes a a partial flat contact face and a retainer portion to prevent the outer sleeve moving up the inner nut when the nut is installed and tightened and prior to release.

FIG. 14 shows a segment on an inner nut of a segmented nut according to an embodiment of the present invention. The segment includes a flat contact face and does not include a retainer portion.

FIG. 15 shows a top perspective view of a segmented nut according to an embodiment of the present invention incorporating upper retainers on the segments of the inner nut for retaining the sleeve.

FIG. 16 shows a bottom (underside) perspective view of a segmented nut according to the embodiment of the present invention shown in FIG. 11b incorporating the lower retainers on the segments of the inner nut adjacent an underside of the inner nut for retaining the sleeve.

FIGS. 17a to 17c show cross sections through a segmented nut according to a further embodiment of the present invention, including the steps of retaining a washer which acts as a retainer for the outer sleeve.

FIG. 18 shows an exemplary graph of applied torque relative to angle of rotation of the sleeve required for release of a segmented nut of at least one embodiment of the present invention.

FIG. 19 shows an exemplary graph of applied torque relative to angle of rotation of the sleeve required for release of a segmented nut of at least one embodiment of the present invention and a comparison with applied torque to angle of rotation for loosening of a traditional nut.

FIGS. 20a to 20e show a segmented nut according to a further embodiment of the present invention.

FIGS. 21 to 24 show alternative arrangements of the interface between the sleeve and inner nut segment according to respective embodiments of the present invention.

FIGS. 25A to 25C show stages of assembling a flanged segmented nut according to a further embodiment of the present invention. Each of the segments includes a portion of the total flange. FIG. 25A shows the sleeve or collar ready to be applied to the segments. FIG. 25B shows the sleeve or collar slid over the segments but not yet rotated to a retaining position. FIG. 25C shows the sleeve or collar rotated relative to the segments and retaining together the segments.

FIGS. 26A and 26B show a flanged segmented nut according to an embodiment of the present invention.

FIGS. 27A and 27B show an alternative flanged segmented nut according to a further embodiment of the present invention.

FIGS. 28A and 28B show an alternative flanged segmented nut according to a further embodiment of the present invention.

DESCRIPTION OF PREFERRED EMBODIMENT

Figure 1:
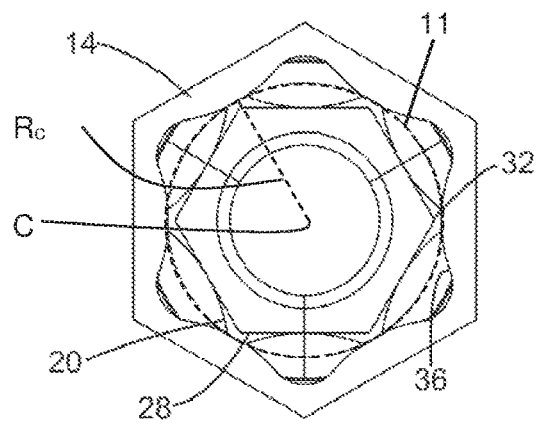
FIGS. 1 and 2 show features of a segmented nut described and shown in prior international patent application PCT/AU2015/050803 and use the same reference numerals.
Figure 2:
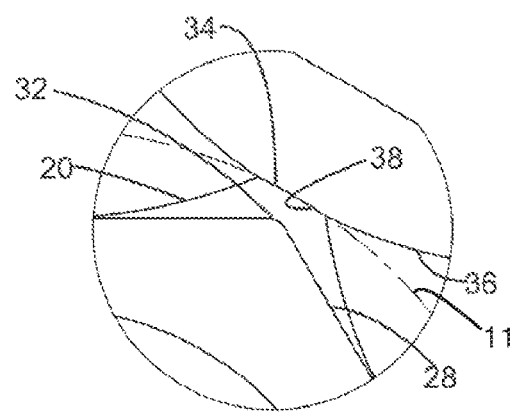

FIGS. 1 and 2 show features of a segmented inner nut 16 having convexly rounded sleeve interface portions 34 i.e. curved or radial sleeve interface portions, which are part cylindrical. The radius from centre $R_C$ of each of these sleeve interface portions is centred at the centre C of the nut itself. Each convexly rounded sleeve interface portion 34 extends through an arc or about 5° to 10°. The centre point or central axis through the aperture through the segmented nut 10 is shown as a dashed circumference line 11 at the curving (cylindrical) interface between the sleeve interface portions 34 of the inner nut segments and the convex portion 36 of the outer sleeve The inner nut 14 and an outer sleeve 16 are press fit together. Each convexly rounded sleeve interface portion 34 of the inner nut bears against a convex portion 36 of an inner face of the outer sleeve 16. Interference fit creating radial retaining forces holds together the outer sleeve about the inner nut.

However, it has been realised that galling can occur at the contacting convexly rounded sleeve interface portions 34 and the convex portion 36 of the outer sleeve when press fitting together the outer sleeve and inner nut.

Furthermore, the requirement for correct tolerancing during such press fit assembly to ensure the release torque for the sleeve relative to the inner nut when releasing the segmented nut is more difficult to achieve or maintain to ensure reliably repeatable mass production.

Also, an exact rotational position between the sleeve and inner nut must be achieved within very tight tolerances otherwise the relatively small contact area at the radius to radius region of the convexly rounded sleeve interface portion and the radiused convex portion of the inner face of the sleeve may cause the segmented nut to inadvertently release during transport or handling if the radiuses are not well aligned.

Figure 3:
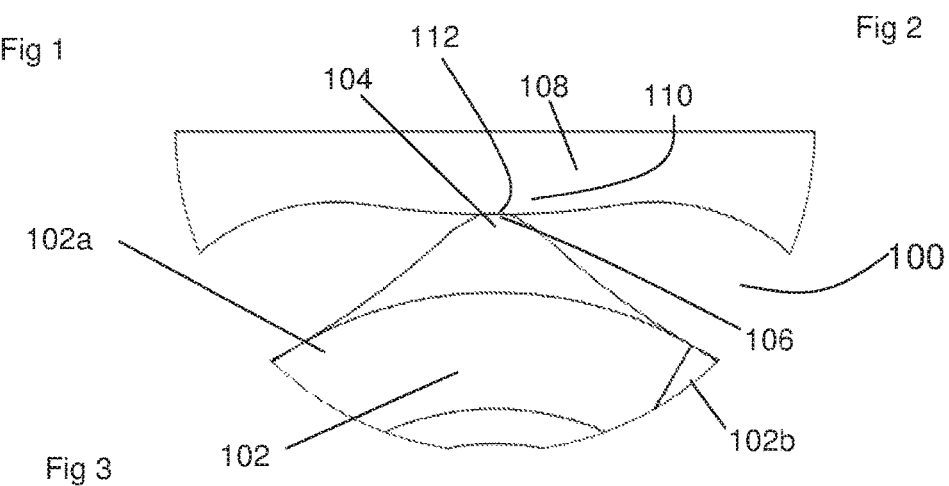
FIG. 3 shows detail of section of a segmented nut having radiused respective convex sleeve interface portions on the inner convex surface of the outer sleeve and on the outer surface at the apices (apexes) of the inner nut portions.

FIG. 3 shows detail of a portion of a segmented nut a segmented nut 100 having a radiused sleeve interface portion 112 on the inner convex surface 110 of the outer sleeve 108 and a radiused sleeve interface portion 106 on the outer surface at the apex 104 of the respective segment 102a of the inner nut 102.

To maintain such a segmented nut assembled (e.g. for transport, storage and initial use) without risk of loss of one or more parts of the segmented nut, a relatively high radial retaining force is present across the contact areas between the convex apexes of the inner nut segments and the inner convex surface of the outer sleeve. This relatively high force helps to prevent inadvertent slipping/rotation of the sleeve around the assembled segments that might otherwise happen with low radial contact force.

An interference fit also prevents axial movement of the sleeve relative to the inner segments during transport. In use, an operative does not want the inconvenience of having to (re)assemble the segmented nut prior to use and incur the resultant loss of useful working time applying the nuts.

Figure 4:
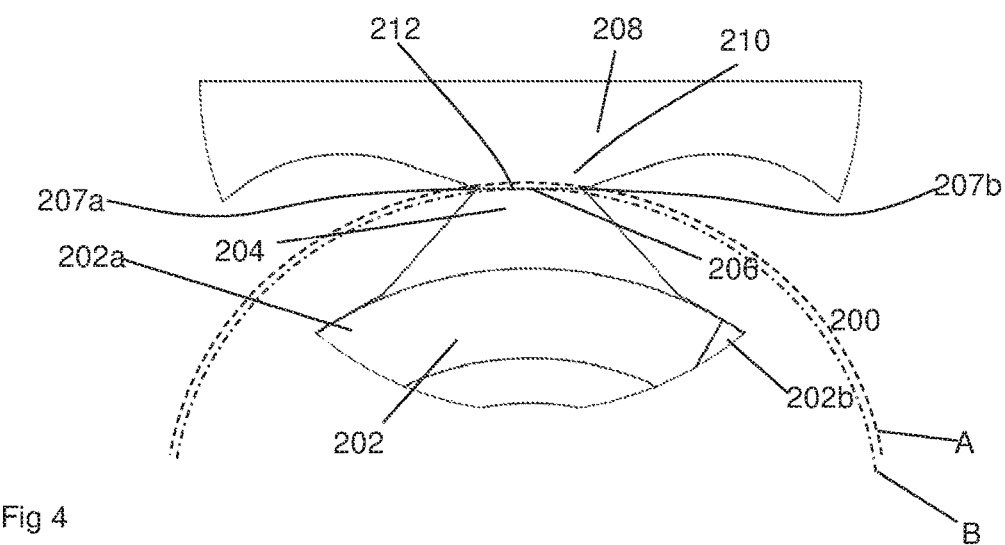
FIG. 4 shows detail of a section of a segmented nut according to an embodiment of the present invention.

FIG. 4 shows detail of a section of a segmented nut 200 according to an embodiment of the present invention.

The segmented nut 200 has an inner nut 202 including inner nut segments 202a, 202b etc. The inner nut segments each have a sleeve interface portion 206 of an apex portion 204. The sleeve interface portion 206 extends between separated apexes 207a, 207b. The apexes 207a, 207b are at a radius (shown as A in regular line) from the central axis of the inner nut that is a greater radius than the radius (B shown in dash-dot lines) of the sleeve interface portion 206 where a sleeve interface portion of a single convex radiused inner nut apex would bear against.

In the embodiment shown in FIG. 4, the sleeve interface portion of each of the respective inner nut segments is preferably generally planar or flat. The separated apexes 207a, 207b provide reliable and predictable resistance to rotation of the outer sleeve 208 relative to the inner nut when the segmented nut is assembled.

One or more embodiments of the present invention provide flat-on-flat interface or contact between the sleeve interface portion 206 of the inner nut segments 202a, 202b, 202c etc., and the inner surface 212 of the sleeve 208.

It will be appreciated that the flat-on-flat interface or contact provides a self centring arrangement whereby the inner nut segments and the outer sleeve locate exactly with each other because of the distinct face to face contact of the opposed flat surfaces rather than the indistinct locating of opposed convex curved surfaces.

When rotating the outer sleeve relative to the inner nut i.e. when releasing the segmented nut, the apex 207b of the respective inner nut segment provides a definite resistance across the extent of the peak of the apex in the direction of rotation.

Furthermore, the apex 207a in the opposite direction resists opposite rotation more positively and distinctly than single convex-to-concave surface contact.

FIG. 6 shows rotation of the outer sleeve 208 relative to the inner nut 202 of the embodiment in FIG. 5. It will be appreciated that, during release, the inner nut does not need to rotate. The inner nut remains stationary or near stationary and the outer sleeve is rotated about the inner nut until the outer sleeve is free from retaining engagement with the inner nut. The outer sleeve can then be removed and the segments allowed to separate from the threaded bolt, stud or rod.

The axial retention feature(s) of one or more embodiments of the present invention may be provided to prevent the sleeve coming off the inner nut at the free face (non-working face) when the segmented nut is in use.

Alternatively, or in addition, the axial retainer feature may be provided to prevent or restrict the sleeve from moving axially away from or past the free face when the sleeve is retained on the inner nut.

The axial retainer feature may allow the sleeve to release and separate from the inner nut when rotated to a sleeve release orientation relative to the inner nut.

The sleeve and inner nut may have a clearance therebetween allowing the sleeve to be removed axially away from the inner nut when the sleeve is rotated to a release position relative to the inner nut during release of the segmented nut.

It will be appreciated that the apex 207b of the inner nut segment has a greater radius from the central axis of the segmented nut than does the flat surface 206. Therefore, there is an increase in resistance to rotation of the outer sleeve relative to the inner nut as the apex engages with the sleeve interface portion 212 of the outer sleeve. The bearing surface 212 of the sleeve 206 may include radiused or angular apexes 212a, 212b.

The amount of resistance can be controlled by the specifications of the segmented nut, such as the materials chosen, the thickness and deflection characteristics of the outer sleeve, and the amount of release resistance for a required application.

As shown in FIG. 6, the respective segment 202*a*, 202*b* etc., of the inner nut 202 can include at least one retainer 214 (such as similarly shown as 814 in FIG. 13). The at least one retainer prevents the outer sleeve 208 from moving axially in one direction past the retainer and otherwise separating from the inner nut. This can be particularly useful during transport, storage and initial use of the segmented nut of the present invention, whereby the outer sleeve and inner nut cannot inadvertently separate in one axial direction relative to each other.

Preferably, each segment of the inner nut includes at least one said retainer.

Preferably such at least one retainer is present to prevent axial movement of the sleeve away from the working (compression) face of the nut.

FIGS. 7 and 8 show the underside (work piece facing) face 316 of the segmented nut 300 according to an embodiment of the present invention.

The embodiment shown in FIGS. 7 and 8 reveal an optional flat bearing face 306 of the inner nut 302 and the flat bearing face 312 of the outer sleeve.

FIGS. 7, 9*a* and 9*b* show an axial retainer pre-formation stage with tabs 315 and an annular groove 315 adjacent/at the lower/working face of the inner nut. FIGS. 8, 10*a* and 10*b* show the formed axial retainers 313 created by the tabs being pressed outward to overlap the lower face of the sleeve.

The embodiment shown in FIG. 8 includes the retainers 314 extending from the outer respective segments of the inner nut 302 to cover at least part of the forward face 316 of the outer sleeve 308. These retainers 314 prevent the outer sleeve 308 and inner nut 302 from separating or partially separating through relative sliding movement of the outer sleeve towards the working face of the inner nut.

FIG. 9*a* shows a groove 315, and proto retainers 313 e.g. each in the form of a tab, in a working face (torque face) 320 of the segments 302*a*, 302*b* of the inner nut of a segmented nut 300 according to a further embodiment of the present invention.

FIG. 9*b* shows detail of the groove 315 and projections 313 shown in FIG. 9*a*.

FIG. 10*a* shows retainers 314 formed from the projections (tabs or proto-retainers) 313 by pressing or other machine operation. The retainers formed from the projections prevent axial removal of the sleeve 308 from the inner nut past the working face 320.

FIG. 10*b* shows detail of the retainers 314 shown in FIG. 10*a*.

FIGS. 11*a* and 11*b* show features and formation of an alternative type of axial retainer 614. The axial retainers 614 in this embodiment are formed by deforming an overhang portion 615 into a channel in a lower portion of the side wall of each respective segment 602*a*, 602*b*.

FIGS. 12*a* and 12*b* show a further form of axial retainer 714 provided adjacent the working face 720 of the inner nut. This form of axial retainer 714 is similar to that shown in FIGS. 9*a*, 9*b*, 10*a*, 10*b* above. Each axial retainer 714 is formed from a projection 713 (such as a tab or proto retainer) formed by a portion of the side wall of the segment and a groove 815 in the underside working face 720 of the segment.

As shown in FIG. 13, a segmented nut 800 can include a segment 802*a* of an inner nut (802 not shown) including two sleeve interface portions 806 which, in use, contact respective inner sleeve interface portions of the outer sleeve (not shown).

A retainer 814 in the form of a shoulder 814*a* is provided at the transition between the retained apex 817 of each angle portion of a hexagonal inner nut and the flat sleeve interface portion (segment interface portion) 806. Such shoulders provide retainers preventing the outer sleeve from sliding off the inner nut by movement toward the non-working (i.e. free) face of the inner nut when the segmented nut is assembled and the parts of the segmented nut are retained together.

As shown in FIG. 13, the inner nut can have at least one retainer provided towards the working face of the inner nut. FIG. 13 includes proto retainers 813 (similar to the embodiment shown in FIGS. 9*a* and 9*b*) with a groove 815 such that, when the segmented nut is assembled, retainers are formed as in FIGS. 10*a* and 10*b*.

FIG. 14 shows a segment 902*a* of an inner nut 902 of a segmented nut with flat sleeve interface portions 906 and no retainers.

FIG. 15 shows a segmented nut 800 embodying a form of the present invention including the segment shown in FIG. 13. The segmented nut 800 includes an inner nut 802 having three segments 802*a*, 802*b*, 802*c*. A sleeve 808 surrounds the segments. Each segment includes a retainer 814 including a shoulder portion 814*a* between the apex 817 and the segment interface portion 806 of the segment. The segment interface portion 806 is bounded by apexes. The apexes may be radiused or a relatively 'sharp' angled discontinuity from the segment interface portion.

FIG. 16 shows an alternative embodiment of a segmented nut 900 consistent with the embodiment shown in FIG. 11*b*. The inner nut 902 has three segments 902*a*, 902*b*, 902*c* surrounded, when the segmented nut 900 is assembled, by a sleeve 908. The segments of the inner nut each have at least one retainer 914 toward a lower face 920 of the inner nut to prevent the sleeve 908 from coming off the segments axially toward the lower (working) face 920 of the inner nut. The segment interface portion 906 is bounded by apexes 907*a*, 907*b*. The apexes may be radiused or a relatively 'sharp' angled discontinuity from the segment interface portion.

FIGS. 17*a* to 17*c* show steps in fitting a retained washer 1023 (such as a Belleville type washer) to a segmented nut 1000 having an outer sleeve 1008, an inner nut 1002 including multiple segments 1002*a*, 1002*b*. The washer 1023 shown is a spring type washer.

In FIG. 17*a*, the washer 1023 is shown in a pre-compressed state, having a dished shape. The prongs 1029 extend upward and outward and do not readily fit into the aperture 1025 in the base/working face of the inner nut.

In FIG. 17*b*, the washer is flat (un-dished), and the prongs 1029 close toward each other and reduce the width of the washer across the prongs zone. The prongs then fit into the aperture 1025.

In FIG. 17*c*, the washer is allowed to spring back to its preferred dished (non-flat) configuration, such that the prongs spread apart again and engage against the angle side faces 1027 of the aperture 1025. The washer is thereby retained to the base of the segmented nut.

When the segmented nut is tightened down in use, the washer becomes flattened out (as in FIG. 17*b* but with the prongs inside the aperture 1025), the prongs release from engagement with the side wall 1027 and the inner nut and sleeve can rotate relative to the washer which can remain still.

The retained washer acts as an axial retention means at the working face end of the nut.

FIG. 18 shows a graph of applied release torque (Nm) (vertical axis) with respect to angle (degrees) of rotation (horizontal axis) of the sleeve for a tightened segmented nut in use. As the outer sleeve rotates from an initial 0° orientation relative to the inner nut, the segments and sleeve increase engagement and radial force across the interface thereof (depending on the initial assembled tolerance and prevailing temperature) requiring deflection of the sleeve and/or segments until the portions of the segments of the inner nut that have increased engagement reach a position at peak torque (preferably at around 2° to 5° of rotation, and more preferably at around 3° to 3.5° of rotation), where after they cease or reduce engagement resulting in a reduction of applied release torque (which can be a near instant decrease or zeroing of applied release torque).

It will be appreciated that embodiments of the present invention requires/provides an increase in applied release torque from a stable face-to-face orientation of the bearing face of the sleeve and segment interface portions of the segments for a tightened segmented nut with initial increase in radially directed force across the interface thereof (providing a safety and reliability feature helping to prevent premature release of the segmented nut) to the point where radial force between contact portion of the inner segments with the sleeve interface portion of the sleeve reduce.

FIG. 19 shows a graph of applied release torque for a segmented nut of the present invention relative to typical loosening torque profile for a traditional nut, when in a clean/pristine state (e.g. without issues of seizing or becoming jammed as can occur in actual use). Actual slope of each release profile will vary depending on the fasteners (nut and bolt) used etc., but will follow a similar pattern of initially increasing torque for embodiments of the present invention and declining applied torque for loosening of a traditional nut.

Therefore, FIG. 19 provides an example of the typical difference in release torque profiles for a segmented nut embodying the present invention and a standard solid nut.

It is evident from the example release torque profile of a segmented nut embodying the present invention that torque required to release the segmented nut can initially increase then, once the sleeve has rotated sufficiently relative to the inner nut (for example, between 3° and 3.5°), the torque required to release the sleeve rapidly declines toward zero to release. This beneficially avoids the 'long tail' of trailing resistance associated with undoing a standard nut. Advantageously, less time taken to completely release a nut of the present invention compared with undoing a standard nut.

FIGS. 20a to 20e show a segmented nut 1100 according to a further embodiment of the present invention. FIG. 20c shows close up detail of the interface arrangement of the sleeve interface portion 1112 of the sleeve 1108 and the segment interface portion 1106 of the inner nut 1102 segment 1102b. The sleeve interface portion 1112 is concave. The segment interface portion 1106 of the inner nut segment is convex and faces the concave the sleeve interface portion when the segmented nut is assembled.

To release the segmented nut, the peak 1112a, 1112b (depending on the 'handedness' of the segmented nut and associated threaded bolt/rod/stud) must pass over the convex segment interface portion of the inner segment. Preferably, the material of the sleeve deflects sufficiently yet providing rotational resistance and therefore a controlled release torque.

Once the peak 1112a, 1112b passes over the peak of the segment interface portion of the inner nut segment, the release torque rapidly declines to zero or near zero and the sleeve disengages from interfacing with the inner nut and the nut is released.

It will be appreciated that release torque initially increases as the relevant peak of the sleeve interface portion has to initially pass over the increasing projection of the segment interface portion.

The segmented nut 1100 includes retainers 1114 provided on the underside of the inner nut to prevent the sleeve from sliding off the inner nut in an axial direction towards the underside/working face of the inner nut.

It will also be appreciated that the segment interface portion of the inner nut segment between the peaks of the sleeve interface portion of the inner face of the sleeve provides a self centring arrangement for the segmented nut. The sleeve tends to bias itself relative to the inner nut such that the convex segment interface portion of the inner nut segments nestles into the concavity of the sleeve interface portion between the peaks 1112a, 1112b.

FIGS. 21 to 24 show alternative embodiments of the interface between the sleeve interface portion and the inner nut segment interface portion. All of these arrangements provide a self centring/stabilising feature wherein the sleeve is biased to remain at a preferred position when the segmented nut is assembled and requires significant release torque to effect release of the segmented nut.

FIG. 21 shows a cross sectional portion through an inner nut 1202 segment 1202a. The segment interface portion 1206 projects into a recessed sleeve interface portion 1212 of the sleeve 1208. In this embodiment, the segment interface portion 1206 has an apex 1206c. The sleeve interface portion 1212 of the sleeve is recessed and receives therein the apex of the segment interface portion. The projecting segment interface portion and recessed sleeve interface portion provide the self centring feature for the segmented nut. The sleeve will tend to want to remain positioned with the apex of the segment interface portion in the base 1212c of the recess of the sleeve interface portion.

To release the segmented nut, the apex of the segment interface portion has to pass one of the boundaries 1212a, 1212b of the recessed sleeve interface portion (which boundary 1212a or 1212b depends on the handedness of the nut and threaded bolt/stud/rod arrangement).

The apex 1206c of the segment interface portion 1206 of the segment is at a greater radius form the centre of the nut than are the boundaries 1212a, 1212b of the sleeve interface portion, causing the sleeve and/or segment to need to deflect or resiliently deform to allow the sleeve to rotate to a release position relative to the segments.

It will be appreciated that the segment interface portion and sleeve interface portion may be in contact with one another when the segmented nut is assembled (i.e. an amount of radial force providing an interference fit) or there may be a small clearance between the segment interface portion and sleeve interface portion until the sleeve is rotated relative to the inner nut and thereby the inner nut segments and sleeve come into interference and a release torque is established.

FIG. 22 shows an alternative embodiment of sleeve 1308 to inner nut 1302 segment 1302a interface. The inner nut segment 1302a has a segment interface portion 1306 with edges 1306a, 1306b, one of which will contact the sleeve interface portion 1312 during rotation of the sleeve 1308 relative to the inner nut 1302. Release of the segmented nut requires deflection of the sleeve and/or inner nut segment to allow the relevant edge 1306a, 1306b to pass the sleeve interface portion 1312.

FIG. 23 shows an alternative arrangement of the interface between the sleeve 1408 and inner nut 1402. The sleeve interface portion 1412 of the sleeve is convex and projects into a concave segment interface portion 1406 of the segment 1402*a*. The concave segment interface portion has edges 1406*a*, 1406*b*. One of the edges must pass the peak 1412*c* of the convex sleeve interface portion 1412 for release of the segmented nut. Release torque increases from the position shown in FIG. 24 until the edge 1406*a*, 1406*b* reaches the peak 1412*c* and then rapidly decreases to fully release the segmented nut.

FIG. 24 shows a further alternative configuration of the interface between the sleeve 1508 and inner nut 1502. The flat segment interface portion 1506 of the inner nut segment 1502*a* is curved (radius r) with edges 1302*a*, 1302*b*. The sleeve interface portion 1512 of the sleeve 1508 is concave. The convex to concave configuration provides a self centring function biasing the sleeve to a preferred rest position relative to the inner nut.

To rotate in either direction (left or right) relative to the inner nut, the respective edge 1512*a*, 1512*b* of the sleeve interface portion 1512 must pass the peak 1506*c* of the curved segment interface portion by deflection of the material of the sleeve and/or inner nut.

FIGS. 25A-25C show consecutive stages of assembling a flanged segmented nut 1710 according to a further embodiment of the present invention. The flanged segmented nut 1710 includes multiple segments 1712*a*, 1712*b*, 1712*c* and a sleeve or collar 1714.

It will be appreciated that the flange portion 1716*a*, 1716*b*, 1716*c* of each segment 1712*a*, 1712*b*, 1712*c* together form a segmented flange 1716 which creates an increased working contact face for the segmented nut compared with a plain segmented nut. In effect the combined flange portions form an integral washer in the sense of spreading contact load against an item to be retained by the segmented nut.

Each of the segments can include a retainer 1718, preferably each segmented includes multiple such retainers 1718*a*1, 1718*a*2, 1718*b*1, 1718*b*2, 1718*c*1, 1718*c*2, such as in the form of a shoulder provided at the transition between the apex of each angle portion of a hexagonal inner nut and the flat sleeve interface portion (segment interface portion). Such retainers or shoulders provide prevent the outer sleeve from sliding off the inner nut by movement toward the non-working (i.e. free) face of the inner nut when the segmented nut is assembled and the parts of the segmented nut are retained together, similar to the embodiment of the segmented nut 800 shown in FIG. 15.

As shown in FIGS. 26A and 26B, two of the segments 1912*a*, 1912*b* include an overlapping flange portion 1916*a*, 1916*b* on the working face of the nut. The remaining segment 1912*c* has a truncated flange portion 1916*c*, allowing a slide/loose fit of that segment into the sleeve 1914 once the first two segments are installed.

As in the embodiment shown in FIGS. 25A-25C, the embodiment shown in FIGS. 26A and 26B benefits from the combination of flange portions and truncated flange portion providing a larger contact face for the nut compared with a plain segmented nut not having a flange.

Assembly of the segmented nut can be by first inserting two of the segments having the overlapping flange portion and moving them out radially until the flats on the segments are touching the matching flats on the inner part of the sleeve. The last segment can then be slid into position.

Figure 29A:
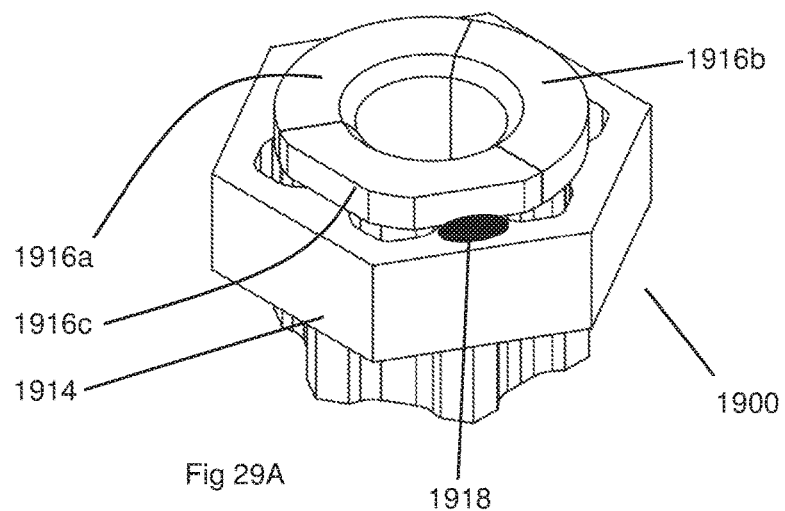
FIGS. 29A and 29B show an embodiment of a flanged segmented nut including a retaining means to restrict/prevent relative rotation of the sleeve/collar relative to the segments after assembly of the flanged segmented nut.
Figure 29B:
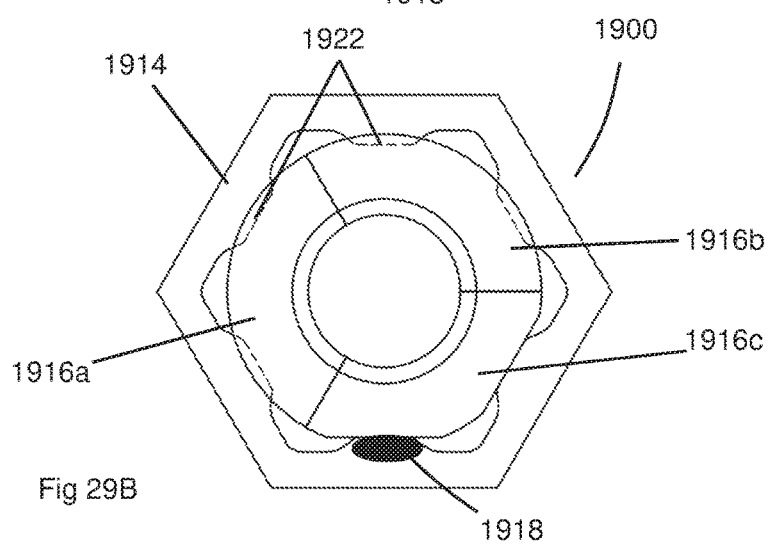

A retaining means, e.g. an applied adhesive or bonding agent 1918 as shown by way of example in FIGS. 29A and 29B, can be applied to this third segment to prevent it from moving back out from the sleeve 1914. Other means can also be used to retain the third or more segments, including deformed/shaped part of the respective segment to create an overlap with the sleeve after assembly.

As shown by way of example in FIGS. 27A and 27B, each of the segments e.g. all three in a segmented nut including three central segments, has a truncated flange portion 2116*a-c* allowing all of the segments 2112*a-c* to be inserted into the retaining sleeve 214 at the same time or two together or one after the other. The truncations of the flange can include two chords for each segment located at a radius which is less than the radius at which the matching flat surfaces of the sleeve, thereby allowing the segments to pass into the sleeve during assembly of the segmented nut.

As in the exemplary embodiment shown in FIGS. 29A and 29B, a retaining means (one of a number of possibilities) can then be applied to each of the segments to prevent them from moving back out from the sleeve. As in the previously described example, using a retainer means, such as a durable adhesive placed the interface of a segment and the sleeve will prevent the segment falling out of the sleeve. Other retainer means/methods can also be used, including deforming part of the segment to create an overlap with the sleeve after assembly.

A further embodiment of the present invention is shown in FIGS. 28A and 28B. Each of the segments has a flange portion 2316*a*, 2316*b*, 2316*c* overlapping the working face of the nut 2300. This design will not allow the nut to be assembled by simply sliding all of the segments 2312*a-c* into the sleeve 2314. However, this arrangement has the benefit of having the largest and most circular contact face for the nut.

For such an embodiment as shown in FIGS. 28A and 28B, assembly of the nut 2300 can be made by holding the segments 2312*a-c* together, placing the sleeve 2314 over the segments and then rotating the sleeve and segments relative to one another to place the flat surfaces of the segments into contact with the matching flat surfaces of the sleeve.

A torque is required to overcome the interference with corners of the flat faces 1720, 1920, 2120, 2320 of the segments with the matching flat face 1722, 1922, 2122, 2322 of the respective sleeve.

Modifications of the assembly process are also possible by using differential temperature effects between the sleeve and the segments (eg heated sleeve and cooler segments) to reduce or completely negate the use of an assembly torque, or by dilation of outer sleeve or other deformation of parts to allow installation of outer sleeve.

No additional retaining means/method is required as the sleeve is held axially as a result of the flange overlap relative to the sleeve.

An assembled segmented nut can include radial freeplay for the segments to move radially whilst still being retained within the sleeve prior to application of the segmented nut to a threaded bolt, stud or rod. Threading of the segmented nut onto the thread of the bolt, stud or rod removes the freeplay and applies radial tension through interaction of the segments and the sleeve.

Figures 30A, 30B, 30C:
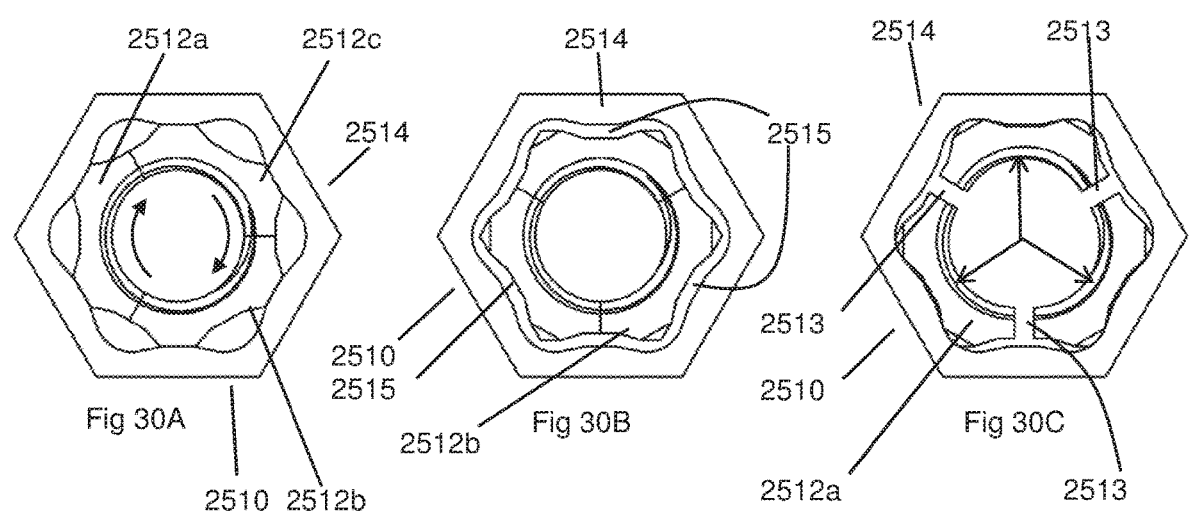
FIGS. 30A to 30C shows in plan view sequential steps from FIG. 30A to FIG. 30C of releasing a segmented nut according to an embodiment of the present invention.

FIGS. 30A to 30C show in plan view the sequential steps of releasing a segmented nut according to an embodiment of the present invention.

FIG. 30A shows the assembled segmented nut 2510 with the sleeve 2514 engaged with the segments 2512*a*-2512*c*.

When the segments and the sleeve are rotated relative to one another (indicated by the rotation arrows in FIG. 30A) clearance is created between the inner profile of the sleeve and the outer profile of the segments, as shown in FIG. 30B.

The segments are then free to move radially into the clearance spaces 2515 created between the inner profile of the sleeve and the outer profile of the segments as a result of the configuration of the inner profile of the sleeve and the outer profile of the segments. One or more embodiments of the present invention allow the sleeve 2514 to be slid off the segments 2512a-2512c in this orientation.

As shown in FIG. 30C, the segments can then move radially (indicated by the arrows) relative to a central axis (at the hub the arrows) of the segmented nut to a release position. This creates clearance 2513 between the adjacent edge faces of the segments as the segments move away from the central axis and therefore away from a thread of a bolt, stud or rod to which the segmented nut would be applied.

The invention claimed is:

1. A segmented nut for threaded engagement with a threaded shaft of a bolt, stud or rod, the segmented nut including an inner nut including at least three segments providing at least a portion of a threaded aperture through the inner nut for engagement with the threaded shaft of the bolt, stud or rod, each of the at least three segments having at least one segment interface portion, and a sleeve engaging around and retaining together the at least three segments when the segmented nut is assembled, the sleeve including a sleeve interface portion, wherein the sleeve engages around and retains together the at least three segments by engagement of the segment interface portions of the at least three segments of the inner nut with a respective part of the sleeve interface portion of the sleeve when the segmented nut is assembled, wherein at least a part of a respective segment interface portion of each of the at least three segments is at a greater distance from a central axis of the segmented nut than a minimum distance of at least part of the sleeve interface portion for the respective segment interface portion from the central axis, wherein the at least one segment interface portion of each of the at least three segments and the respective part of the sleeve interface portion are in engagement with each other during at least part of release of the segmented nut, wherein at least one segment of the inner nut is separable from contact with another segment of the inner nut when the segmented nut is moved into a released position, wherein at least one of the sleeve interface portion and the respective segment interface portion is configured to resiliently deform through contact of the sleeve interface portion and the respective segment interface portion during relative rotation of the sleeve and inner nut as the sleeve interface portion and the respective segment interface portion pass one another during release of the segmented nut, wherein the segmented nut comprises at least one axial retainer provided on the inner nut, the axial retainer being configured to restrict removal of the sleeve from the at least three segments in at least one axial direction, the at least one axial retainer being adjacent a working face of the inner nut or adjacent to a free face of the sleeve distal from the working face of the inner nut, the at least one axial retainer allowing the sleeve to release and separate from the inner nut when the sleeve is rotated to a sleeve release orientation relative to the inner nut.

2. The segmented nut of claim 1, wherein the sleeve is capable of rotation relative to the inner nut such that radial force(s) between the sleeve and the at least three segments initially increase(s) by contact of the segment interface portions with the respective part of the sleeve interface portion of the sleeve and subsequently decreases to release the sleeve from retaining engagement with the inner nut.

3. The segmented nut of claim 1, wherein the sleeve is capable of rotation relative to the inner nut such that the sleeve interface portion and the respective segment interface portions passing one another forces radial deformation of at least one of the at least three segments and the sleeve at their respective interfaces.

4. The segmented nut of claim 3, wherein the radial deformation is a function of angle of rotation of the sleeve relative to the inner nut.

5. The segmented nut of claim 1, wherein the sleeve interface portion or the respective segment interface portion includes at least one respective peak or apex which contacts the other of the respective segment interface portion or the sleeve interface portion during relative rotation of the sleeve and the inner nut.

6. The segmented nut of claim 1, the at least one axial retainer including a shoulder or lip which the sleeve cannot pass beyond without undergoing deformation.

7. The segmented nut of claim 1, wherein the at least one axial retainer is integral with a respective segment of the at least three segments.

8. The segmented nut of claim 7, wherein the at least one axial retainer is formed by pressing or machining the inner nut or the at least three segments of the inner nut.

9. The segmented nut of claim 1, wherein the at least one axial retainer is formed during an assembly process for the segmented nut.

10. The segmented nut of claim 1, the sleeve and the inner nut having a clearance therebetween allowing the sleeve to be removed axially away from the inner nut when the sleeve is rotated to the sleeve release orientation relative to the inner nut.

11. The segmented nut of claim 1, including a captive washer.

12. The segmented nut of claim 11, wherein the captive washer includes a Belleville washer.

13. The segmented nut of claim 11, the washer providing axial retention of the sleeve relative to the inner nut in a direction toward a working face of the inner nut.

14. The segmented nut of claim 1, wherein at least one of the at least three segments includes a flange portion at a working face of the respective segment.

15. The segmented nut of claim 14, wherein the respective flange portion overlaps at least a portion of the sleeve.

16. The segmented nut of claim 1, wherein at least one of the at least two segments includes a flange portion at a working face of the respective segment.

17. The segmented nut of claim 16, wherein the respective flange portion overlaps at least a portion of the sleeve.

18. The segmented nut of claim 1, wherein an amount of radial freedom of movement or radial freeplay allows the at least three segments to move radially while still being retained within the sleeve prior to application of the segmented nut to the threaded shaft of the bolt, stud or rod, and wherein threading of the segmented nut onto the threaded shaft of the bolt, stud or rod applies radial tension through interaction of the at least three segments and the sleeve and removes the amount of radial freedom of movement or radial freeplay.

19. The segmented nut of claim 1, wherein one or both of the sleeve interface portion of the sleeve and the segment interface portion of the respective segment of the inner nut is/are flat.

20. The segmented nut of claim 19, wherein the inner nut and the sleeve have a stable or self-centering engagement position when assembled together prior to tightening about the threaded shaft of the bolt, stud or rod due to the respective flat sleeve interface portion and/or the flat segment interface portion.

21. The segmented nut of claim 1, wherein the sleeve interface portion and/or the segment interface portion of at least one of the at least three segments has at least one apex or ridge.

22. The segmented nut of claim 21, wherein the at least one apex or ridge is a curved apex or ridge or an angular apex or ridge.

23. The segmented nut of claim 22, wherein the curved apex or ridge or the angular apex or ridge has an acute internal angle.

24. A segmented nut for threaded engagement with a threaded shaft of a bolt, stud or rod, the segmented nut including an inner nut including at least two segments providing at least a portion of a threaded aperture through the inner nut for engagement with the threaded shaft of the bolt, stud or rod, at least one of the at least two segments including at least two segment interface portions and a remainder of the at least two segments each including at least one segment interface portion, and a sleeve engaging around and retaining together the at least two segments when the segmented nut is assembled, the sleeve having an inner surface providing a sleeve interface portion, at least one of the sleeve interface portion and a respective segment interface portion undergoing resilient deformation through contact of the sleeve interface portion and the respective segment interface portion during relative rotation of the sleeve and inner nut as the sleeve interface portion and the segment interface portions pass one another during release of the segmented nut, wherein the segmented nut comprises at least one axial retainer provided on the inner nut, the axial retainer being configured to restrict removal of the sleeve from the at least two segments in at least one axial direction, the at least one axial retainer being adjacent a working face of the inner nut or adjacent to a free face of the sleeve distal from the working face of the inner nut, the at least one axial retainer allowing the sleeve to release and separate from the inner nut when the sleeve is rotated to a sleeve release orientation relative to the inner nut.

25. The segmented nut of claim 24, wherein an amount of radial freedom of movement or radial freeplay allows the at least two segments to move radially whilst still being retained within the sleeve prior to application of the segmented nut to the threaded shaft of the bolt, stud or rod, and wherein threading of the segmented nut onto the thread of the bolt, stud or rod applies radial tension through interaction of the at least two segments and the sleeve and removes the amount of radial freedom of movement or radial freeplay.

26. The segmented nut of claim 24, wherein one or both of the sleeve interface portion of the sleeve and the segment interface portion of the respective segment of the inner nut is/are flat.

27. The segmented nut of claim 26, wherein the inner nut and the sleeve have a stable or self-centering engagement position when assembled together prior to tightening about the threaded shaft of the bolt, stud or rod due to the respective flat interface portion and/or the flat segment interface portion.

28. The segmented nut of claim 24, wherein the sleeve interface portion and/or the segment interface portion of at least one of the at least two segments has at least one apex or ridge.

29. The segmented nut of claim 28, wherein the at least one apex or ridge is a curved apex or ridge or an angular apex or ridge.

30. The segmented nut of claim 29, wherein the curved apex or ridge or the angular apex or ridge has an acute internal angle.

* * * * *